Patented Aug. 4, 1931

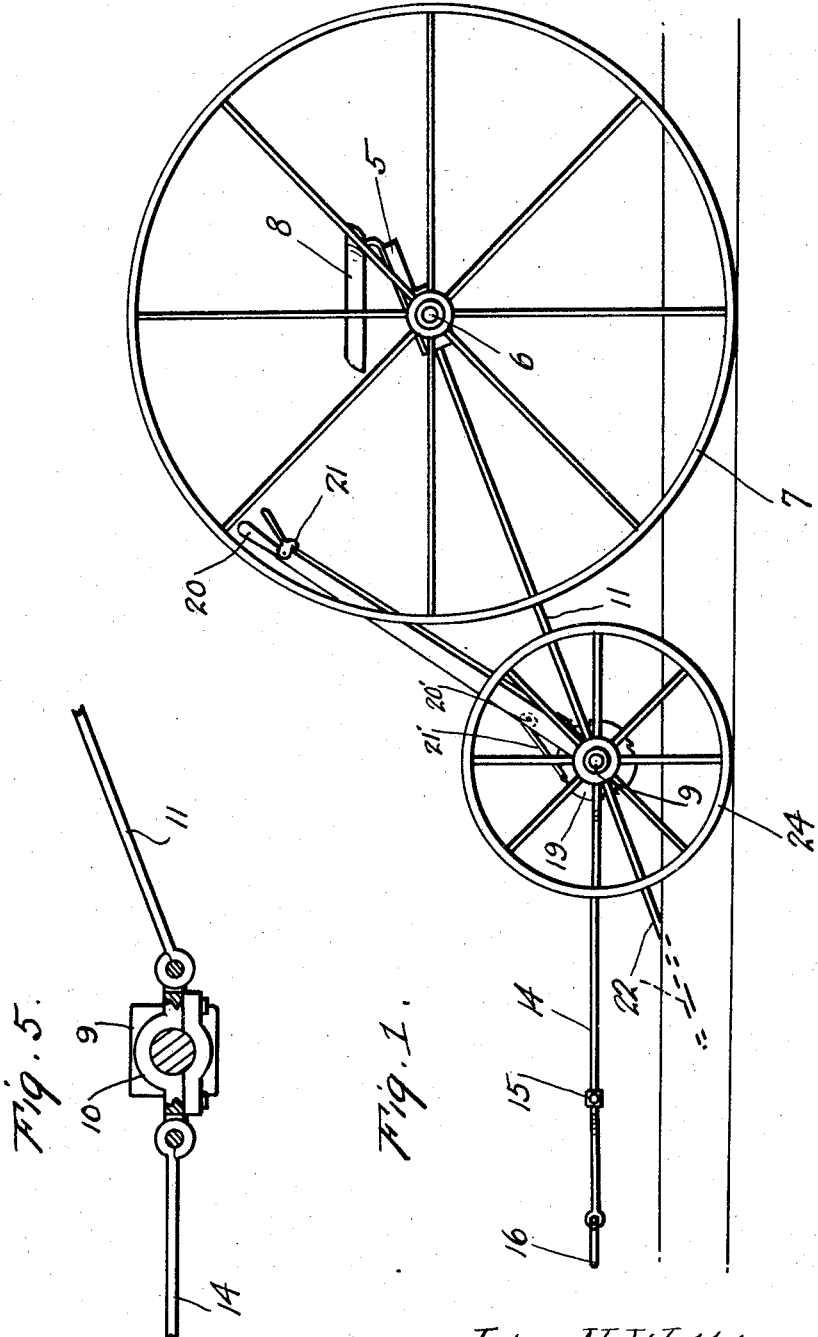

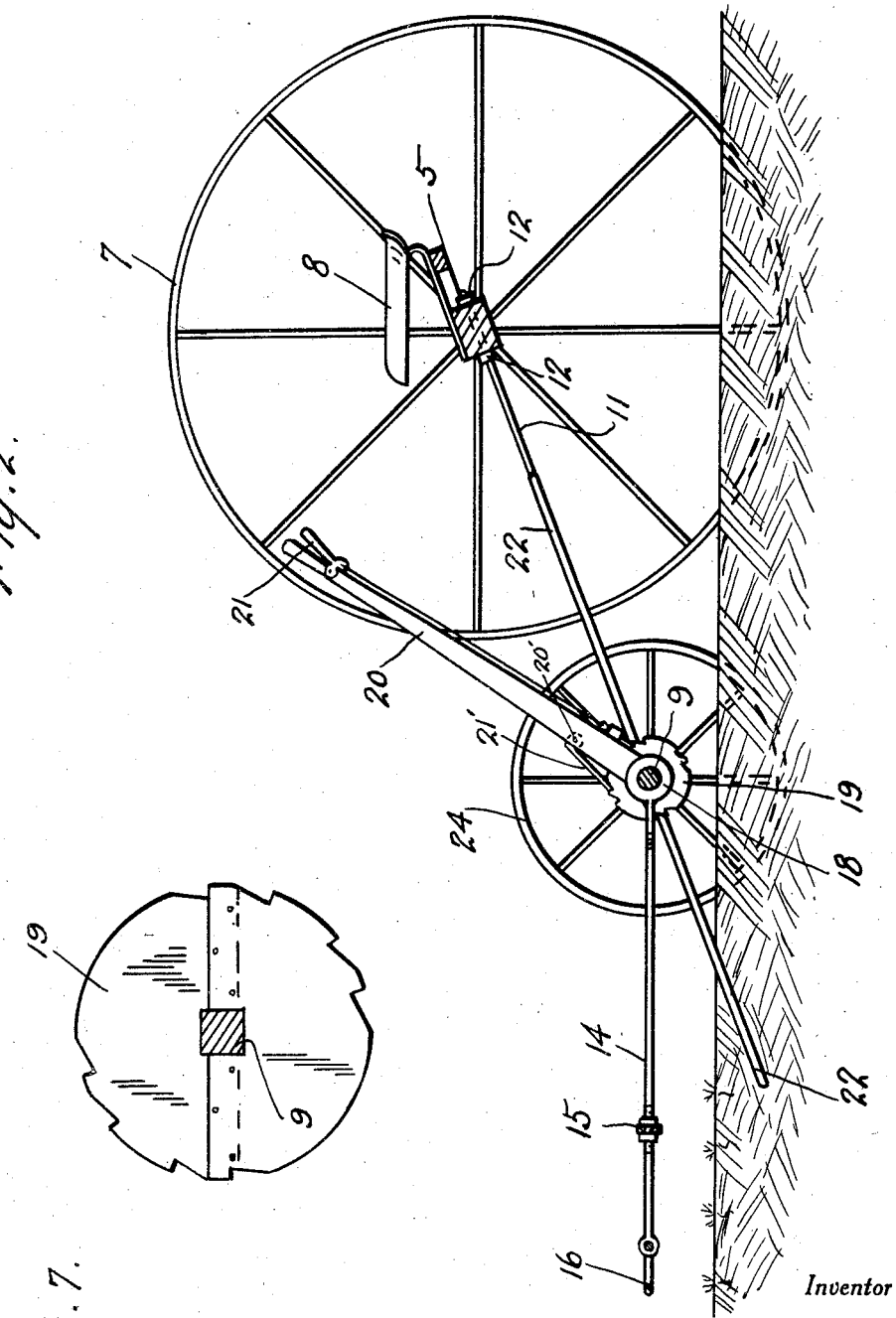

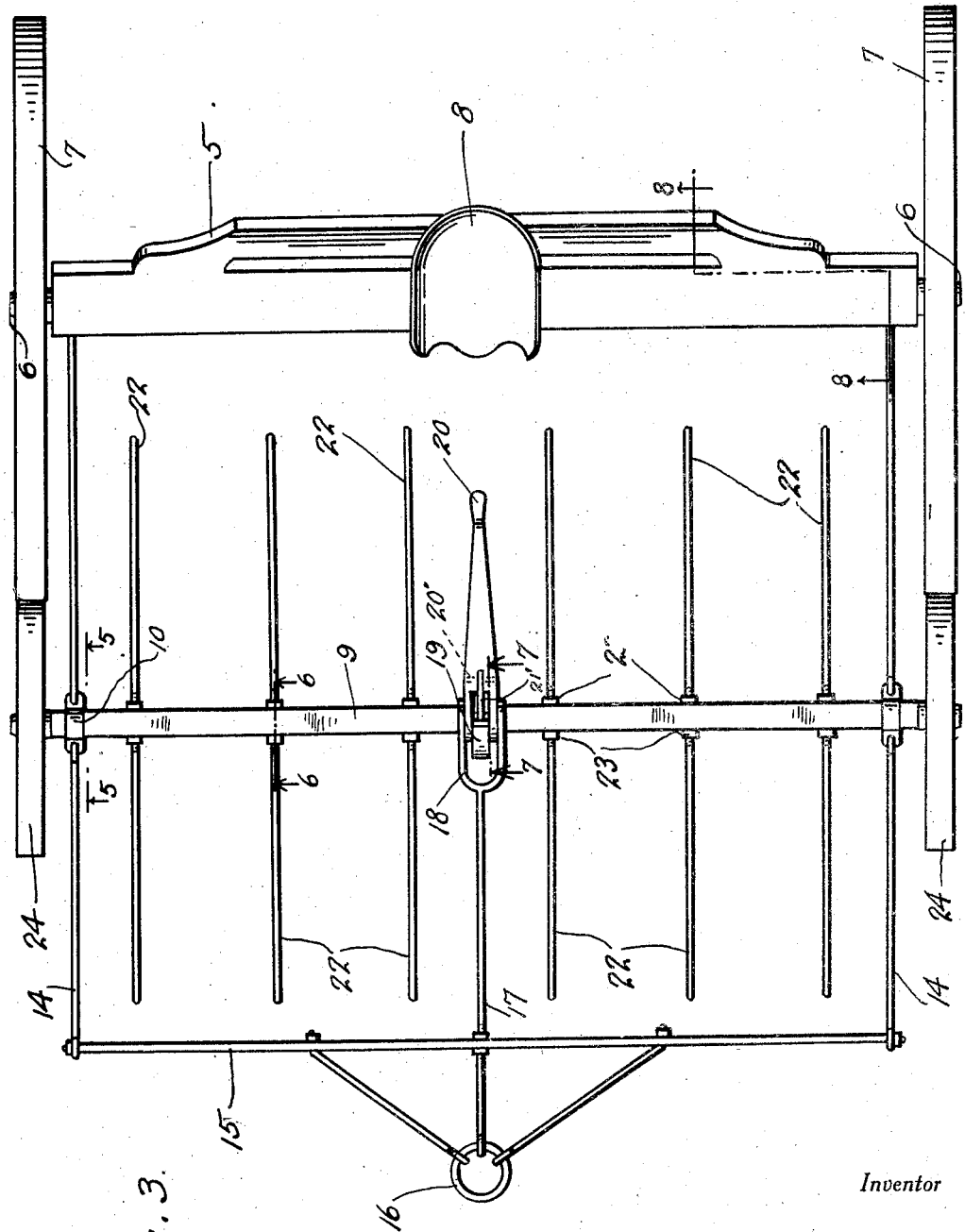

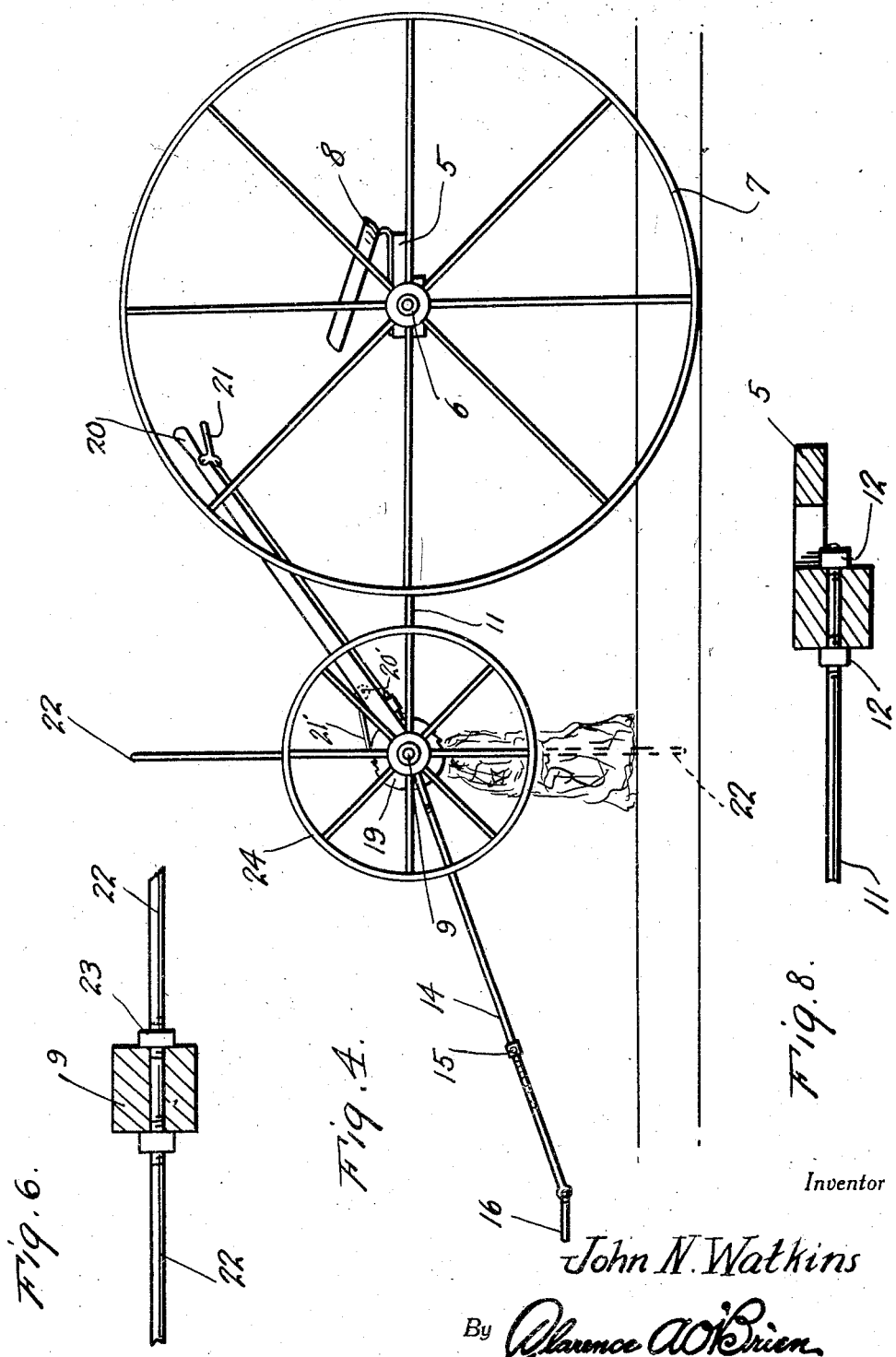

1,817,450

UNITED STATES PATENT OFFICE

JOHN N. WATKINS, OF IOWA CITY, IOWA

QUACK GRASS DESTROYER

Application filed May 8, 1930. Serial No. 450,762.

The present invention relates to a mobile apparatus for destroying quack grass and the like after a field has been plowed and has for its prime object the provision of an apparatus of this nature which will comb the roots of the quack grass or the like out of the ground and deposit them in windrows at desired intervals, the operation being controlled by a person sitting on the apparatus.

A still further very important object of the invention resides in the provision of an apparatus of this nature which is simple in its construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the apparatus showing the same in a position for the tines to comb the ground, Figure 2 is a longitudinal vertical section therethrough, Figure 3 is a top plan view thereof, Figure 4 is a side elevation of the apparatus showing the same ready to dump the quack grass roots and the like in a windrow, Figure 5 is a detail sectional view taken substantially on the line 5—5 of Figure 3, Figure 6 is a detail section taken subtantially on the line 6—6 of Figure 3, Figure 7 is a detail sectional view taken substantially on the line 7—7 of Figure 3, and Figure 8 is a sectional view taken substantially on the line 8—8 of Figure 3.

Referring to the drawings in detail it will be seen that the numeral 5 denotes a cross beam terminating in stub axles 6 on which are journaled the wheels 7. A suitable seat 8 is mounted on the center of the cross bar 5. A transverse shaft 9 is journaled in bearings 10.

The forward portion of the cross bar 5 is thickened as is indicated in Figure 8 and rods 11 have their rear ends extending therethrough and secured in place by a nut 12. The front ends of these rods 11 are engaged with the bearings 10. Rods 14 are also engaged with the bearings 10 and project forwardly and are connected to a cross member 15 to which is secured a suitable hitch structure 16.

A rod 17 is secured to the center of the cross member 15 and has its rear end forked as at 18 and the central portion of the axle extends therethrough. On the center of the axle there is anchored a segmental ratchet 19. A fork lever 20 is rockable on the central portion of the shaft to straddle the ratchet 19 and has a detent structure 21 thereon for cooperation with the ratchet 19. Furthermore a dog or member 21' is anchored to the lever 20 as at 20' and the free end of said member 21' cooperates with the ratchet 19 as and for a purpose to be hereinafter made manifest.

A plurality of elongated tines 22 extend transversely through the axle 9 at regular spaced intervals and the central portions of these tines are anchored to the axle by means of nuts 23 or in any other suitable manner. Wheels 24 are journaled on the ends of the axle 9 smaller in diameter than the wheels 7.

In using this apparatus the same is pulled along the plowed field with the tines in the position clearly indicated in Figures 1 and 2 so as to comb the ground of the roots of quack grass and the like and then when the tines have become full of quack grass roots and the like, the operator on the seat 8 holding the lever 20 to prevent rotation of the shaft 9 operates the detent structure 22 to release the ratchet 19, and by rocking the lever 20 the dog 21 engaging the ratchet 19 will cause the shaft to rotate which will cause the axle 9 to be lifted upwardly to the position shown in Figure 4 so that the roots and the like on the tines will slip off in a windrow and, of course, the other ends of the tines are brought around as the apparatus is moving forward so as to take the desired position as illustrated in Figures 1 and 2.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A wheeled apparatus of the class described comprising a transverse rotary member, tines projecting therethrough and anchored therein, a lever in which the member is rotatable, a ratchet on the member, a detent structure on the lever to engage the ratchet for holding the shaft with the tines at the desired angle, and additional means carried by said lever for engagement with the ratchet to rotate said rotary member upon rocking movement of the lever.

2. In an apparatus of the class described, a cross member terminating in stub axles, wheels journaled on the axles, rods extending forwardly from the bar, bearings on the forward ends of the rods, a shaft journaled through said bearings, wheels journaled on the ends of the shaft, a plurality of tines extending through the shaft and having their central portions anchored thereto, and draft means associated with the shaft.

3. In an apparatus of the class described, a cross member terminating in stub axles, wheels journaled on the axles, rods extending forwardly from the member, bearings on the forward ends of the rods, a shaft journaled in said bearings, wheels journaled on the ends of said shaft, a plurality of tines extending through the shaft and having their central portions anchored thereto, a ratchet on the central portion of said shaft, a lever on the central portion of the shaft having a detent structure for co-operation with the ratchet, and a member pivotally mounted on said lever and engageable with the ratchet for imparting rotative movement to said shaft when said lever is rocked.

In testimony whereof I affix my signature.

JOHN N. WATKINS.